United States Patent [19]
Oura

[11] Patent Number: 5,677,908
[45] Date of Patent: Oct. 14, 1997

[54] HAND-OVER METHOD FOR MOBILE COMMUNICATION

[75] Inventor: Hideto Oura, Tokyo, Japan

[73] Assignee: Oki Electric Industry Co., Ltd., Tokyo, Japan

[21] Appl. No.: 466,196

[22] Filed: Jun. 6, 1995

Related U.S. Application Data

[63] Continuation of Ser. No. 417,856, Apr. 7, 1995.

[30] Foreign Application Priority Data

Apr. 8, 1994 [JP] Japan ..................................... 6-070382

[51] Int. Cl.$^6$ ..................................................... H04J 3/06
[52] U.S. Cl. ........................ 370/331; 370/350; 370/507; 370/516; 375/356; 375/362; 375/371; 455/33.2
[58] Field of Search ..................................... 370/324, 331, 370/350, 503, 507, 508, 516, 517, 518, 519, 332, 337, 512, 310, 312, 321, 328, 329, 336, 347, 506, 509; 375/356, 358, 362, 357; 455/33.2, 51.1, 33.3, 49.1, 54.1

[56] References Cited

U.S. PATENT DOCUMENTS

| | | | |
|---|---|---|---|
| 5,258,980 | 11/1993 | Maebara et al. | 370/347 |
| 5,363,376 | 11/1994 | Chuang et al. | 370/337 |
| 5,483,537 | 1/1996 | Dupuy | 370/350 |

FOREIGN PATENT DOCUMENTS

| | | |
|---|---|---|
| 0286 614 A1 | 10/1988 | European Pat. Off. |
| 0 578 506 A2 | 1/1994 | European Pat. Off. |
| 3-82227 | 4/1991 | Japan . |
| WO 94/05109 | 3/1994 | WIPO . |

OTHER PUBLICATIONS

Y. Akaiwa, H. Andoh and T. Kohama, "Autonomous Decentralized Inter–Base Station Synchronization for TDMA Microcellular Systems", 1991, IEEE, pp. 257–262.

"A Study of TDMA Frame Synchronous System Between Plural Cell Stations in a Street Microcell", pp. 2–247, Autumnal Convention in 1993 of Electro Information & Communication Society.

"A Network Synchronization for TDMA Frame Synchronization Between Plural Cell Stations", pp. 2–346, Spring Convention, 1991 of Electro Information & Communication Society.

*Primary Examiner*—Wellington Chin
*Assistant Examiner*—Huy D. Vu
*Attorney, Agent, or Firm*—Rabin, Champagne & Lynt, P.C.

[57] ABSTRACT

If a mobile station or a base station considers it necessary to perform a hand-over, a new base station is selected as a hand-over receiving base station and a hand-over supplying base station is defined as a master base station whereas the hand-over receiving base station is defined as a slave base station depending on the master base station. The slave base station receives a signal from the master base station, compares it with a frame timing signal of the master base station, adjusts a frame phase of the slave base station into a frame phase of the master base station, and adjusts a frame phase of a down link line from the slave base station to the mobile station into a frame phase of a down link line from them aster base station to the mobile station. Further, the slave base station adjusts, in response to a signal from a mobile station targeted to be handed over, a frame phase of an up link line from the targeted mobile station to the slave base station so that a hand-over without break can be performed.

19 Claims, 12 Drawing Sheets

FIG. 5
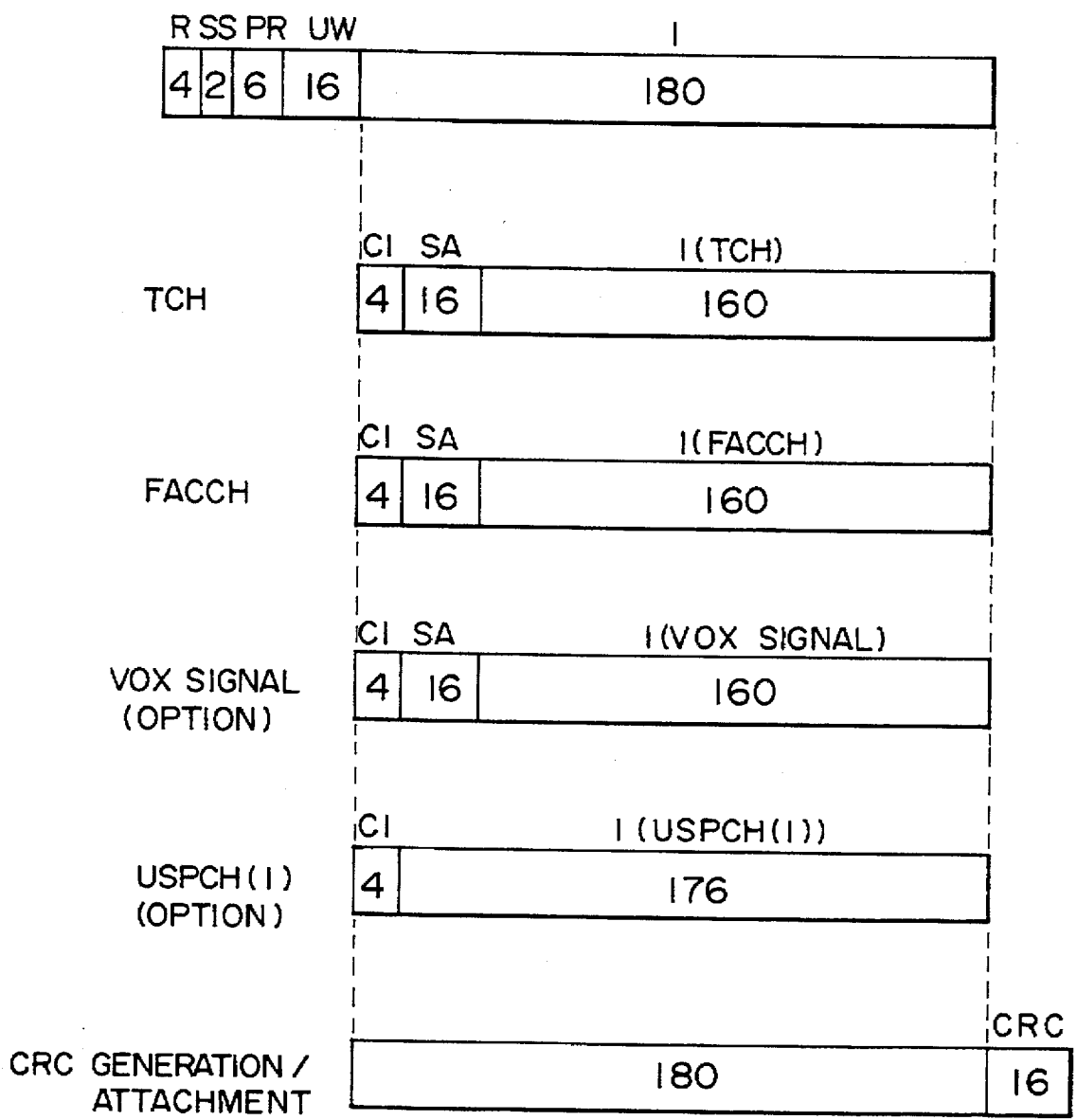
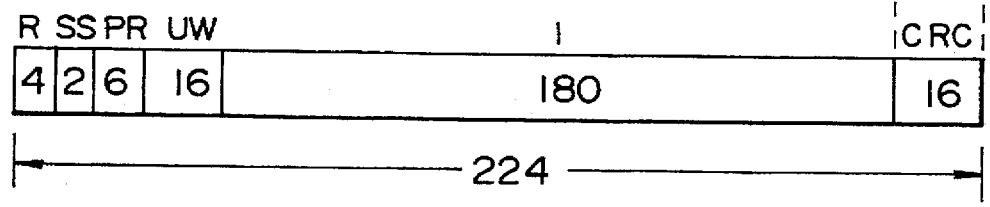

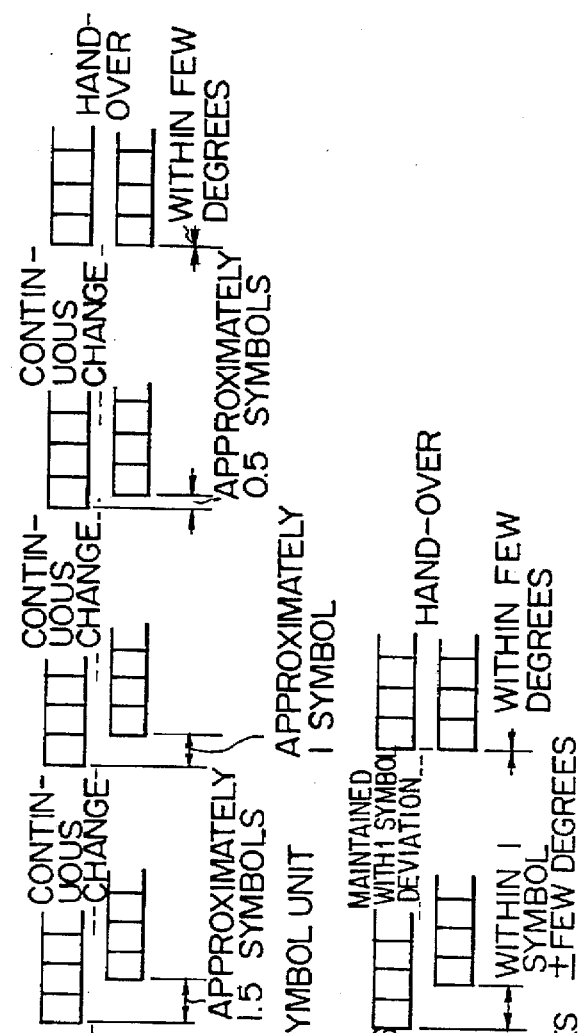
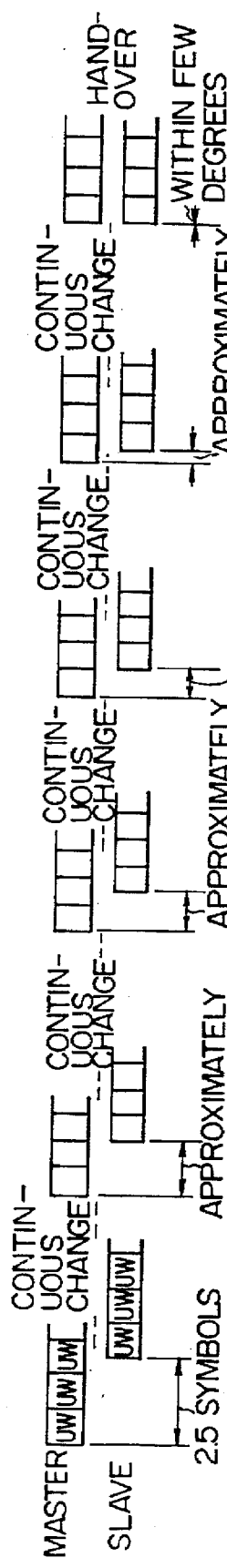
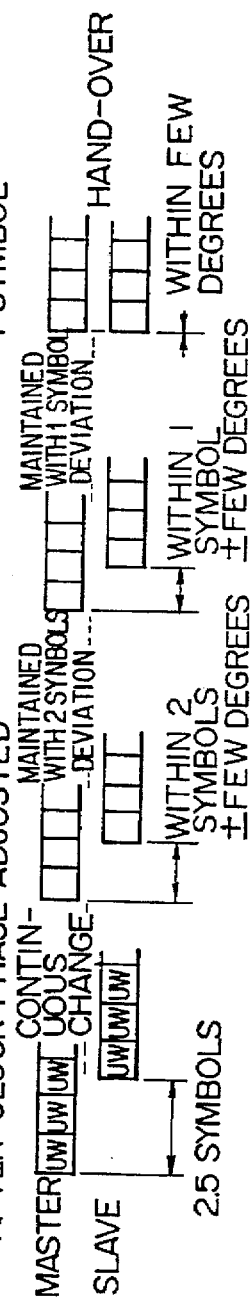
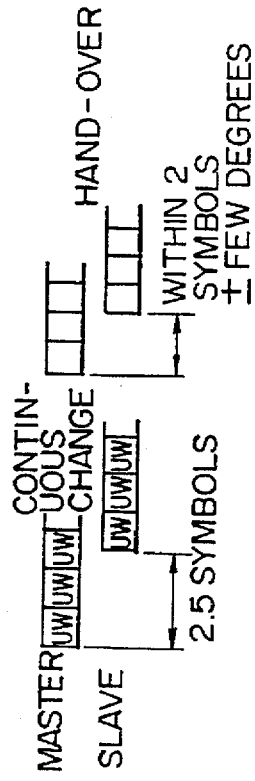
FIG. 11
(A) METHOD FOR CONTINUOUSLY ADJUSTING FRAME PHASE
(B) METHOD FOR ADJUSTING PHASE PER SYMBOL UNIT AFTER CLOCK PHASE ADJUSTED
(C) METHOD FOR PROMPT HAND-OVER JUST AFTER CLOCK PHASE ADJUSTED

HAND-OVER METHOD FOR MOBILE COMMUNICATION

REFERENCE TO RELATED APPLICATIONS

This application is a continuation of application, Ser. No. 08/417,856, filed Apr. 7, 1995. Futhermore, this application claims the priority right under 35 U.S.C. 119, of Japanese Patent Application No. Hei 06-070382 filed on Apr. 8, 1994, the entire disclosure of which is incorporated herein by reference.

BACKGROUND OF THE INVENTION

1. Field of the Invention

The present invention generally relates to a hand-over method for mobile communication and, more particularly, to a hand-over method effectively applied to mobile communication such as a personal handy phone system ("PHS") utilizing microcells. A term "hand-over" means in the specification a procedure to maintain a call or communication even though a mobile station which initiates the call in one radio zone moves, during the call, to another radio zone.

2. Description of the Related Art

A lot of effort has been made in research and development (R&D) with respect to the PHS. The PHS is a mobile communication system having an approximately 100 meter-wide communication zone, whereas one base cell station (CS) in a mobile/portable phone system (cellular system) has a few kilometer-wide communication zone. The PHS can reduce transmission output power of a personal mobile station (PS) by shrinking the communication zone of the base cell station, whereby utilization of the personal mobile station for a long time can be realized with the same battery capacity as used in the cellular phone. Furthermore, reduction of the transmission output power of the personal mobile phone can be realized by employing various types of small sized and light weight component parts so that the personal mobile phone can be miniaturized and reveal excellent portability.

As described above, since the base cell station in the PHS has a communication zone of restricted coverage, a personal mobile station moving at a high speed, for example, does not stay for a long time within the same communication zone to which the mobile station is currently connected which necessitates a frequent change-over control of base cell stations. Accordingly, the PHS is designed to be used by a personal mobile station, as a target station to which a call is made, moving at a similar speed to that at which a pedestrian walks. However, since even the pedestrian generally makes calls which exceed one minute on average, the personal mobile station carried by the pedestrian may leave the communication zone of the base cell station to which the personal mobile station is currently connected. Accordingly, a hand-over function is necessitated which performs the hand-over toward a plurality of base cell stations.

A conventional cellular phone system has revealed momentary disconnection or break of a call for a period from 0.7 to 0.8 seconds when the communication channel was changed over, as disclosed, for example, in a book entitled "Automobile Phone" at page 200, in lines 3–12, edited by Electro Communication Society and supervised by Moriji Kuwabara. Such momentary disconnection which occurs at the time when the communication channel is changed over, may be heard by a subscriber as a noise in the case of voice transmission. The noise may cause data errors in the case of data transmission. Assuming that both mobile stations of the cellular phone system and the PHS move at the same speed, the smaller the cell size is, the higher the possibility of occurrence of a momentary disconnection due to such a hand-over operation. Since the microcell of the PHS is smaller in zone size than that of the cellular system, a momentary disconnection or break due to the hand-over operation may occur more frequently in the PHS.

To eliminate the above described break, there have been proposed a couple of techniques disclosed, for example, in "A study for TDMA frame synchronous system between plural cell stations in a street microcell", B-247, Autumnal Convention in 1993 of Electro Information and Communication Society or "A network synchronization for TDMA frame synchronization between plural cell stations", B-346, Spring Convention in 1991 of Electro Information and Communication Society. According to the above mentioned two references publications, the radio frame synchronization is employed to achieve the following two major objects. The primary object is to effectively utilize frequencies (to avoid radio collision) by synchronizing the radio frames and avoiding interferences between adjacent cell stations. The second object is to realize a hand-over without break.

Although these two objects are not clearly distinguished in the above mentioned publications, the degree of accuracy necessary for the frame synchronization differs in each of the two objects. The accuracy of the radio frame synchronization required for accomplishing the first object to realize the effective usage of frequencies, is considered to be less than that required for accomplishing the second object to realize the hand-over operation without a break. Therefore, the accuracy of the radio frame synchronization required for the hand-over operation without a break is much different from that required for the effective usage of frequencies, which is not, however, disclosed in the above mentioned publications.

There has been disclosed in a Japanese laid-open patent publication Tokkai Hei 03-82227 a method for controlling a change-over of radio channels, which can change over the radio channel without interrupting an active communication line. In other words, the above patent publication discloses a technique wherein the radio channel is changed over after establishing, in advance, both a bit synchronization and a frame synchronization between the currently connected cell station and the target base cell station to which the communication will be changed over, and confirming, in advance, the target radio channel at a slot which is not utilized in the current communication, in which case a personal mobile station which is currently communicating may then perform the change-over operation.

Therefore, according to the technique disclosed in the above patent publication, the change-over operation is performed in such a manner that the personal mobile station preserves the bit synchronization and the frame synchronization of the slot in which the communication is currently performed, changes over a frequency to the frequency of the target radio channel at the slot other than the slot currently used, receives data in a bit and frame synchronous timing which is independent on the slot currently communicated, and establishes a received bit and a frame synchronization of the target radio channel. Accordingly, procedures in the personal mobile station become complicated and the power consumed in the procedures increases, which is unsuitable for realizing a miniaturized and light weight handy portable subscriber phone.

SUMMARY OF THE INVENTION

It is, therefore, a primary object of the present invention to provide a hand-over method for mobile communication which can establish synchronization between a slave base station to which communication is handed over and a personal mobile station from which the communication is handed over.

It is another object of the present invention to provide a hand-over method for mobile communication which can perform the hand-over operation without a substantial break.

To accomplish the above objects, there is provided a hand-over method utilized when a mobile station moves from a radio zone of a first base station to a radio zone of a second base station, the method having steps of: receiving a first down-link signal from the first base station to the mobile station at the second base station; adjusting a clock phase for a second down-link signal from the second base station to the mobile station into a clock phase of the first down-link signal; receiving a first up-link signal from the mobile station to the first base station at the second base station; adjusting a clock phase for a second up-link signal from the mobile station to the second base station into a clock phase of the first up-link signal; and performing by the second base station a hand-over operation.

The hand-over method, according to the present invention, utilized for a case that a personal mobile station moves from a radio zone of one base (cell) station where the personal mobile station is currently positioned to another radio zone of another base station which the personal mobile station approaches to enter, reveals the following features to accomplish the above objects.

If the mobile station or the base station judges that the hand-over is necessary, a new base station to which the hand-over is to be made (hereinafter a "hand-over receiving base station") is selected and defined as a slave base station which should be subordinated to a master base station which is a base station from which the hand-over is carried out (hereinafter a "hand-over supplying base station"). Then, the slave base station receives a signal from the master base station, compares it with a frame timing signal of the master base station, adjusts its frame phase to that of the master base station, and adjusts the frame phase of a down-link line from the slave base station to the mobile station to that of the down-link line from the master base station to the mobile station.

Furthermore, the slave base station adjusts, in response to the signal from the mobile station designated as the target station to which the hand-over is made, the frame phase of an up-link line from the mobile station, to the slave base station so that the hand-over operation is carried out without a break.

In accordance with the present invention, all of the phase differences of the neighboring base stations are not adjusted but, only the frame phase difference between the two base stations for which the hand-over operation is necessitated is temporarily adjusted. Thus, if the base station or the mobile station detects, for example, a deterioration communication quality or a weakening of received electric field strength, a judgement is made that the hand-over operation is necessary. The base station designates a new base station as a hand-over receiving base station in accordance with this judgement. Then, a detailed frame synchronization is performed between the hand-over supplying base station (master base station) and the hand-over receiving base station (slave base station). The slave base station is dependently synchronized with the master base station.

Then, the slave base station receives a signal wave transmitted from the master base station, recognizes the frame signal transferred from the master base station, and compares it with the frame timing signal contained therein. Since there is a phase difference within, for example, a few symbols between the two signals, it may be impossible to perform the hand-over without a break under the current conditions. To solve the problem, the slave base station performs an operation to adjust its frame phase to be that of the frame signal of the master base station.

Then, the down-link line from the slave base station to a mobile station to which the hand-over operation is targeted (hereinafter a "target mobile station") is enabled to be handed over when the phase difference in the phase adjustment operation is, for example, no more than a few degrees.

Furthermore, the slave base station adjusts, in response to the transmitted signal from the target mobile station to the master base station, the frame phase of the up-link line from the mobile station to the slave base station. In other words, the clock synchronization and the frame synchronization are performed, thereby reproducing data according to the regular procedure.

BRIEF DESCRIPTION OF DRAWINGS

By way of example and to make the description more clear, reference is made to the accompanying drawings in which:

FIG. 5 is a chart illustrating another example of a frame format on a physical slot for control in the PHS;

FIG. 11 is an explanatory view illustrating a method (A) in which a frame phase is continuously adjusted, a method (B) in which a phase is adjusted in steps of one symbol after a clock phase is adjusted, and a method (C) in which a prompt hand-over operation is carried out after a clock phase is adjusted, in accordance with the present embodiment.

DETAILED DESCRIPTION OF THE PREFERRED EMBODIMENTS

Although a detailed description will be made as to embodiments of a hand-over method for mobile communication according to the present invention by referring to the attached drawings, a description of related technologies will be firstly made prior to the description of the present embodiments in order to provide a better understanding of the present invention.

Figure 2:
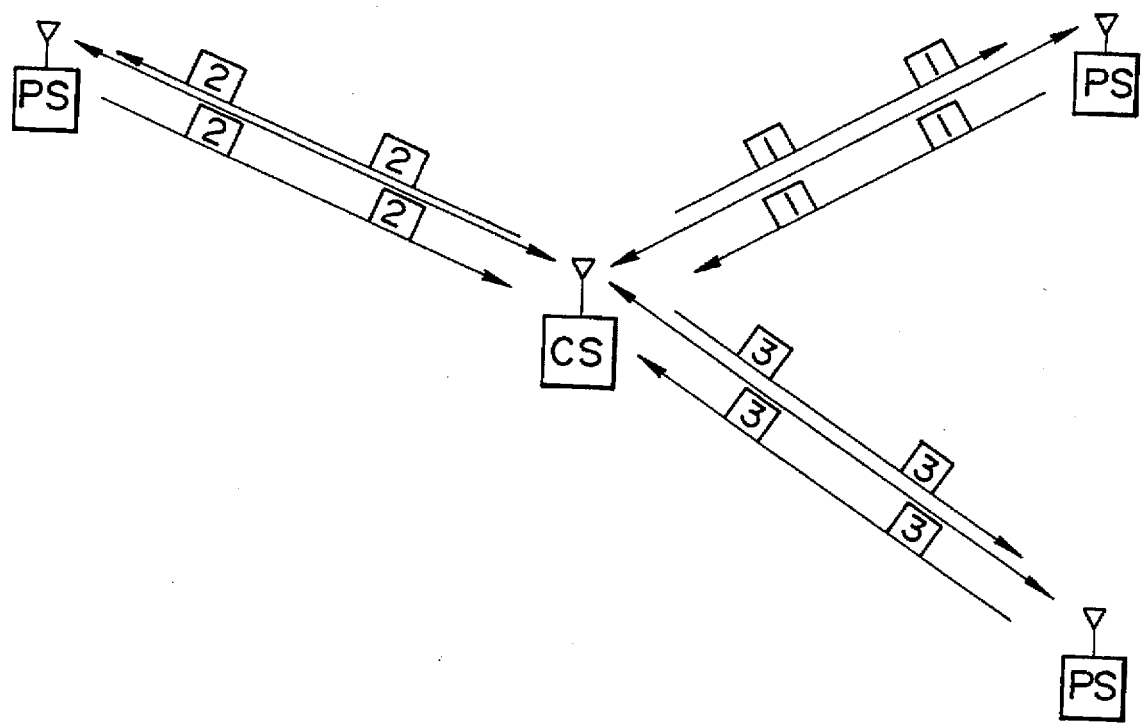
FIG. 2 is a conceptual view illustrating TDMA communication.

The TDMA (Time Division Multiple Access) system has been, for example, well known as one of the methods, to which the present invention is applicable, for connecting a base station to a mobile station by employing multiple channels. In the TDMA signals are transmitted in FIG. 2, signals are transmitted in a burst state and communications are made during a predetermined period. Neighboring bursts have generally been used for communication with a different party or for communication between different parties. Accordingly, there is provided a certain period of time, which is called a "guard time", in which no signals are transmitted to avoid interference between the neighboring bursts.

Figure 3:
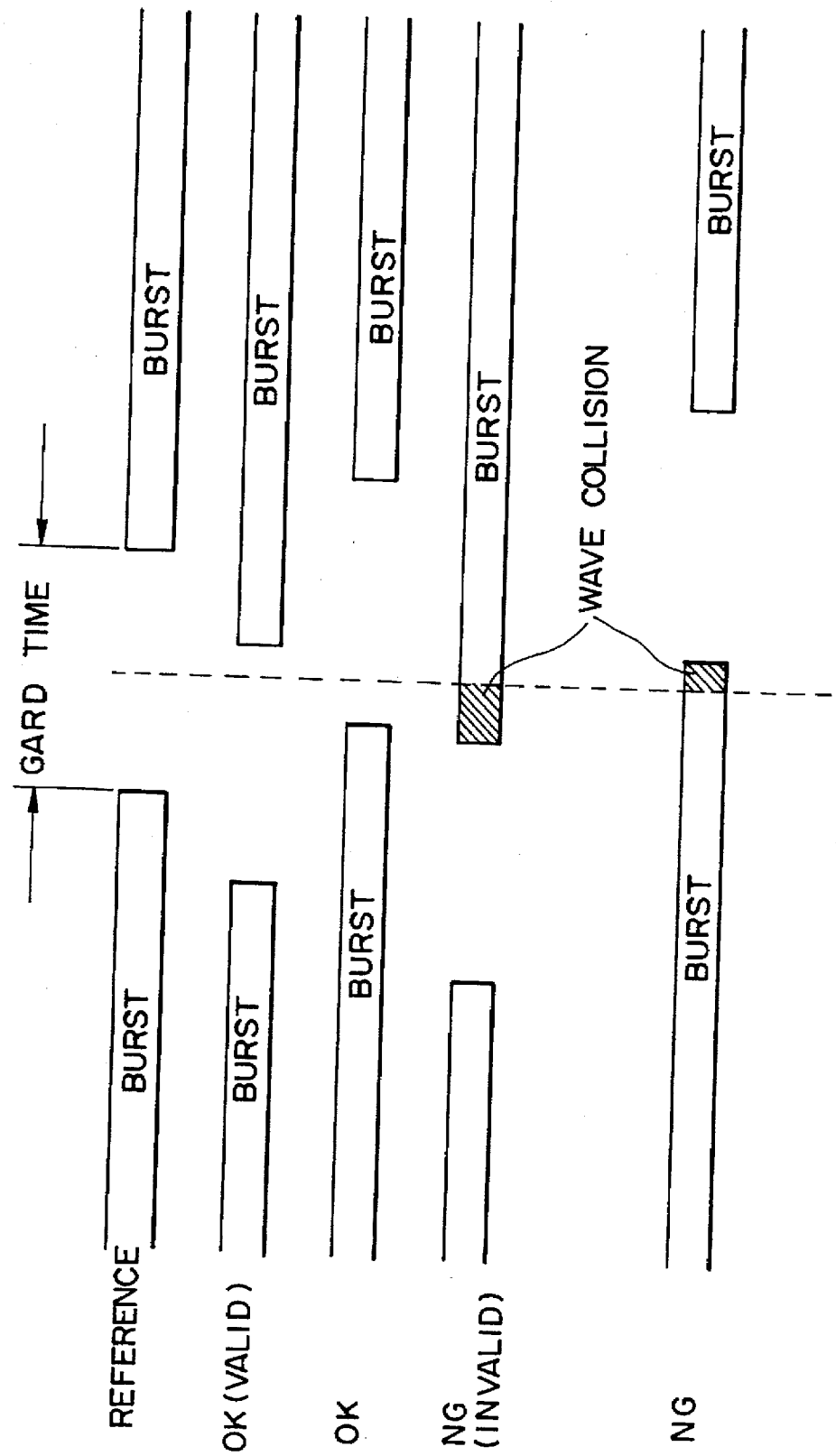
FIG. 3 is an explanatory view illustrating a guard time.

In order to accomplish the object for effectively using frequencies, timings of each neighboring burst should not exceed the guard time to avoid radio wave collision with each other as illustrated in FIG. 3. In taking the deviation from front and rear edges of the burst into consideration, one half of the guard time is considered to be a range of allowance for the radio frame synchronization.

Now, a description will be made as to the hand-over (channel change-over) without break. Since all signals for communication are received as bursts in the TDMA system, the receiver: performs a bit synchronization, which is defined to reproduce a clock and to reproduce data at the optimum data recognition timing, searches a frame signal, and receives an information signal with reference to the frame signal. In order to carry out these procedures, it is required that there sufficient time for the bit synchronization (preamble signal) and a frame signal of a length of time in which no error detection occurs.

Figure 4:
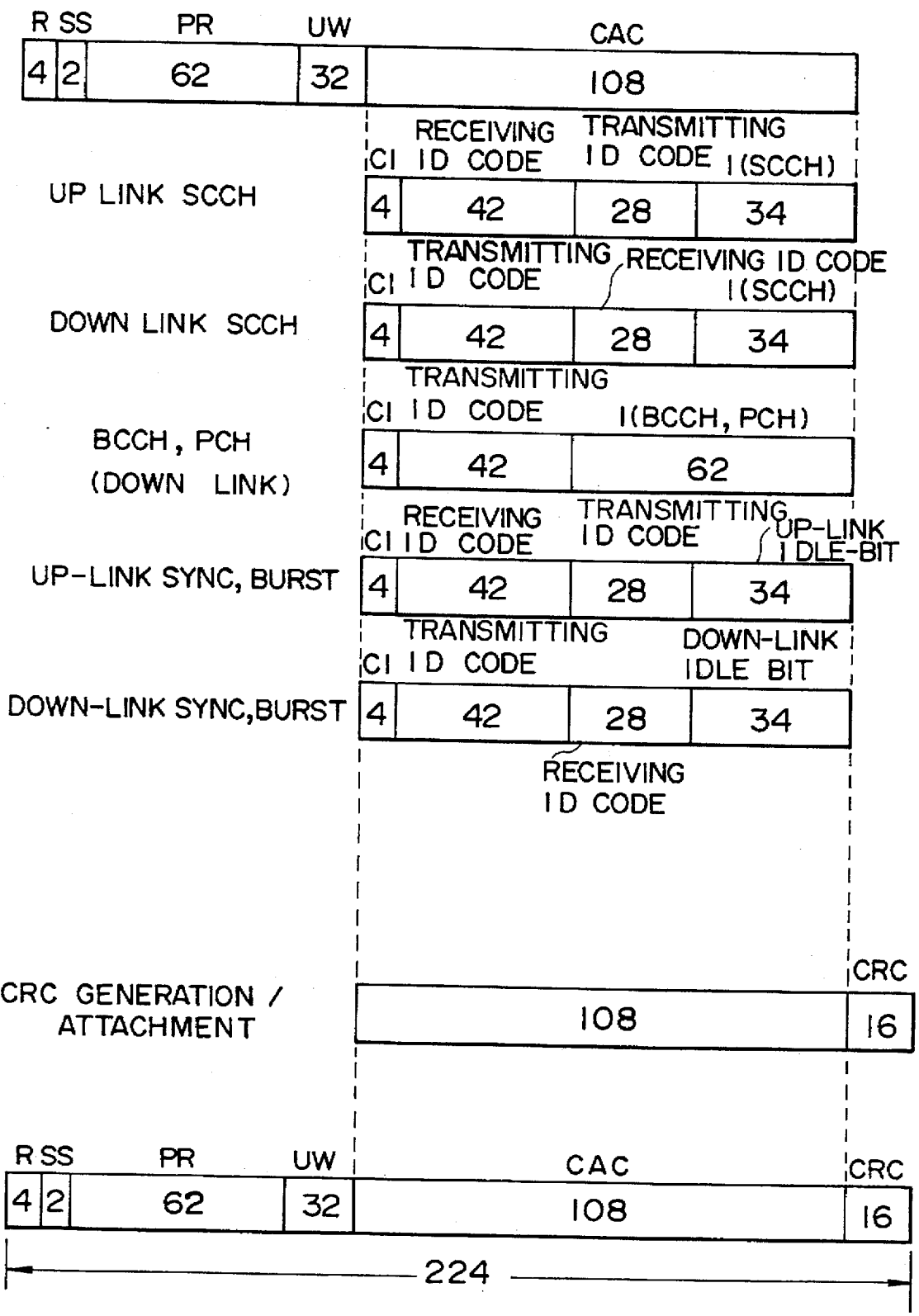
FIG. 4 is a chart illustrating an example of a frame format on a physical slot for control in the PHS.

FIG. 4 shows a frame format on a physical slot for control in the PHS. Since all the signals of the slot must be received from a single burst signal on the physical slot for the control shown in FIG. 4, the lengths of time for the preamble signal PR and the frame signal UW are set to be longer than those of the frame format on a physical slot for communication (which will be described later).

As described above, the TDMA system requires a lot of bits for radio transmission other than information bits which presents should be essentially transferred, which a problem from a viewpoint of effective usage of frequencies. To solve the problem, there has generally been provided a system in a TDMA system such as a mobile radio system, in which the preamble signal PR for bit synchronization will be almost eliminated when the communication is established, and the clock phase of the preceding burst is preserved. In FIG. 4 and FIG. 5 (which will be described later), reference characters R, CI, CAC and SS denote a ramp time signal for excess response, a channel classification, a control signal and a start symbol, respectively.

FIG. 5 illustrates a frame format of the physical slot for communication in the PHS. This format has been proposed by Radio System Development Center (RCR) as a standard format STD-28. As shown in FIG. 5, the preamble PR for clock reproduction has only six bits so that it is extremely small.

Figure 6:
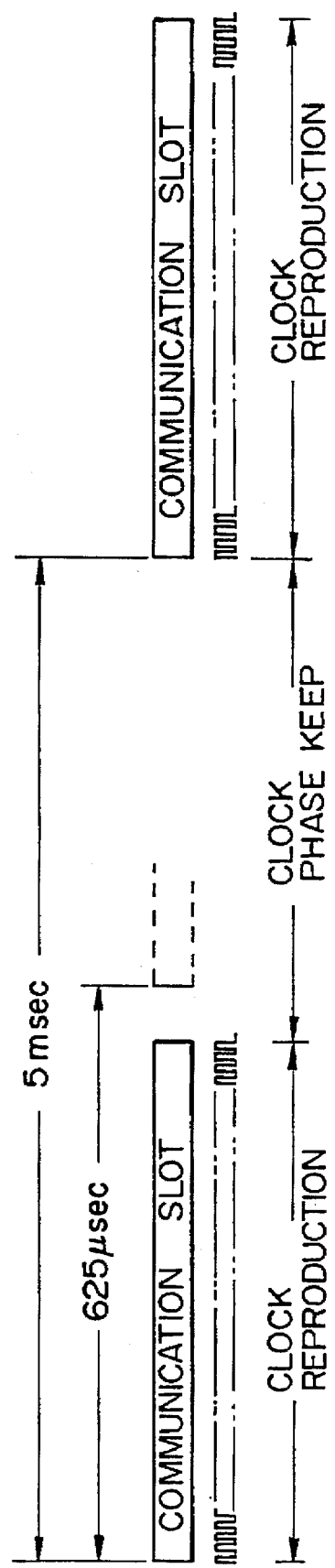
FIG. 6 is an explanatory view illustrating a clock phase lock in the PHS.

In such a system, the received data are reproduced by the receiver at the beginning of the burst in accordance with the clock phase preserved at the preceding burst. Accordingly, transmission from a transmitter must be accompanied by a clock which preserves the clock phase of the preceding burst. Otherwise, the normal receiving operation cannot be guaranteed by the receiver. An example in the PHS is shown in FIG. 6.

In the case of the hand-over without break, the mobile station recognizes that the base cell station, which transmitted the preceding burst, differs from that which transmits the following burst. However, the mobile station can only recognize the clock phase of the preceding burst, so that it tries to transmit or receive in accordance with the clock phase of the previous burst. Accordingly, in the case of the hand-over without break, the base station must transmit the clock phases of the base stations after they are adjusted. Further, unless the base station receives in accordance with the clock phase which is received by the previous base station, the normal receiving operation becomes impossible.

The range in which these clock phases should be adjusted depends on a desired performance. It may require an allowance (accuracy) within a few tens of degrees This means that the accuracies to be required are much different as between the radio frame synchronization for effective usage of frequencies, which allows a range of the guard bit having normally from a few symbols to a few tens of symbols, and the aforementioned radio frame synchronization for the hand-over without break. In order to accomplish the hand-over without break in the PHS utilizing microcells, the frame phase difference is required to be adjusted within a few tens of degrees.

For example, if the radio frame synchronization is performed in the PHS utilizing microcells simply for the benefit of the effective usage of frequencies, not so much phase accuracy is required. If the phase accuracy would be escalated to that required for the hand-over without break, it would be presumed that the communication system would become complicated or require high manufacturing cost.

Accordingly, the present invention is intended to provide a hand-over method without break in the PHS utilizing microcells, in which the radio frame synchronization for the effective usage of frequencies is realized in a relatively simple and realistic way, which does not require complicated configuration or cost increase.

Now, the concept of the method will be described hereinafter.

(1) A high accuracy frame synchronization is firstly performed during the short period of time with which the hand-over operation is performed between the two base cell stations.

(2) A method of making the frame synchronization between the two base cell stations utilizes space propagation. In other words, the method proceeds in such a manner that the depended base station receives the transmission wave from the other base station and tries to establish frame synchronization by synchronizing therewith.

(3) Timings for phase synchronization and hand-over are set in such a manner (3a) that after matching the frame phases with each other at a predetermined constant speed, the hand-over operation is performed. Further, (3b) after completion of phase adjustment of the symbol, the frame phase is adjusted per symbol unit and the hand-over operation is performed. Furthermore, (3c) after completion of phase adjustment of the symbol, the hand-over operation is performed without adjusting the frame phase.

Still further, (4) as a temporary dependent synchronization of the hand-over operation, there is employed either a method which depends only on the target slot or a method which depends on all slots including the target slot, that is, depends on each of the base stations. And, (5) a stable hand-over operation without break can be realized even in such a system that there are various differences in distance between the base stations, and the mobile stations by accelerating a clock reproduction speed of the target base station at the time of the hand-over operation, being limited only to the receiving timing of the base station, and protecting the frame synchronization.

"Structure of Base Station"

Figure 7:
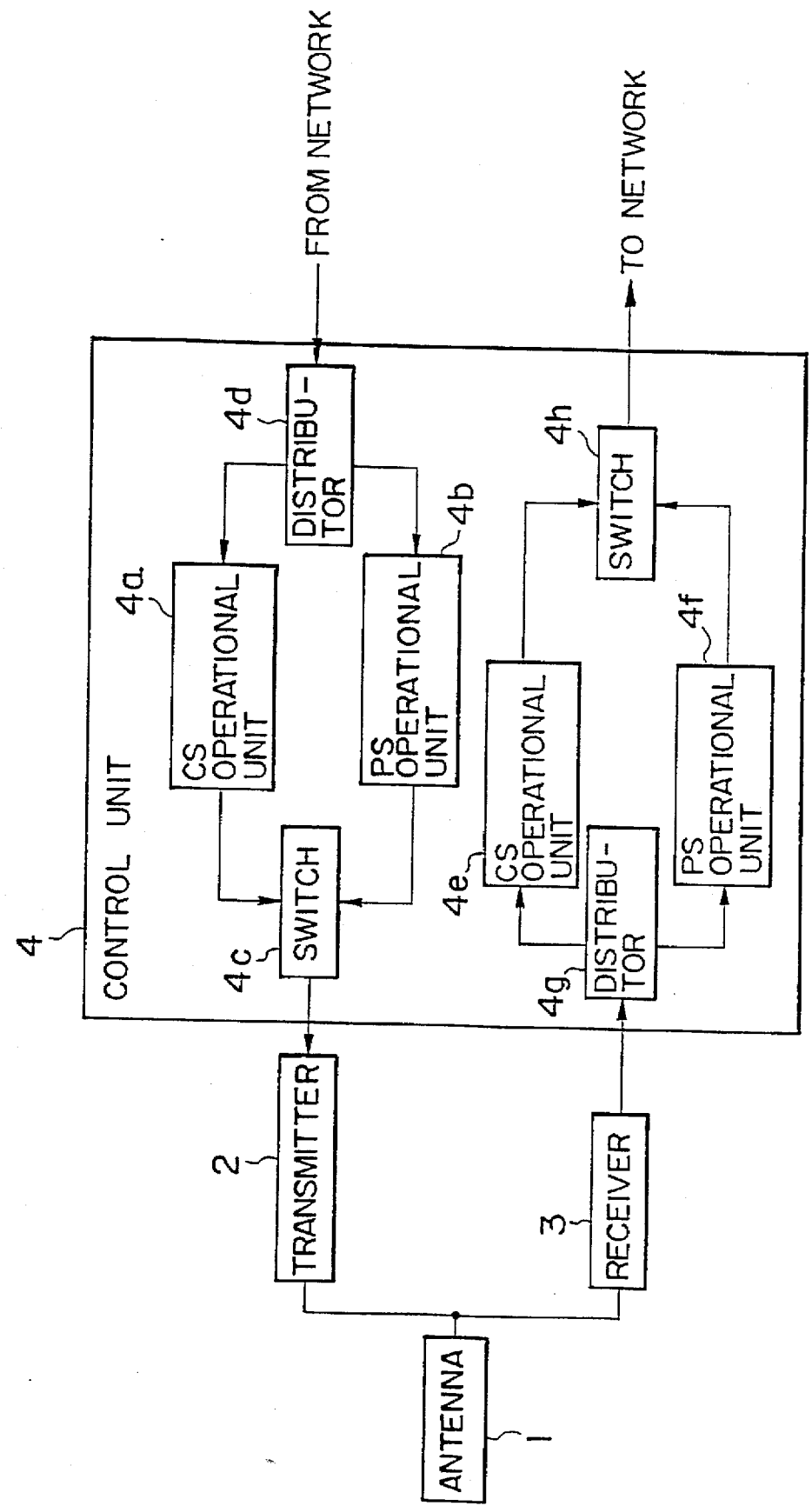
FIG. 7 is a functional block diagram illustrating a base cell station CS according to the present embodiment.

FIG. 7 is a functional block diagram illustrating a structure of the base station according to the present embodiment. In FIG. 7, the base station is constituted of an antenna 1, a transmitter 2, a receiver 3 and a control unit 4. Further, the control unit 4 is constituted of a CS operational unit 4a for transmitting, a PS operational unit 4b, a switch 4c and a distributor 4d and also includes a CS operational unit 4e for receiving, a PS operational unit 4f, a switch 4h and a distributor 4g.

The structure shown in FIG. 7 employs the PS operational unit 4b for transmitting and the PS operational unit 4f for receiving. The PS operational unit 4f serves as a perch. The PS operational unit 4b operates dependently of the PS operational unit 4f, the function of which is to capture a control channel. More concretely, the function to capture a channel at the time when the power is turned on is called a perch and the mobile station PS is transferred to a waiting state after completion of the perch. A detailed description of the perch function is made in, for example, RCR STD-27 Draft Standard "Digital Mobile Phone System" 4.1.10.1(3), which is a definition of a perch channel.

The PS operational unit 4f having such a perch function and to the CS operational unit 4c are used alternatively. In other words, the signal from the receiver 3 is supplied to the distributor 4g, distributed and supplied to the PS operational unit 4f and the CS operational unit 4e. Then, the signals are respectively processed to perform the PS operation and the CS operation and supplied to the switch 4h. And, either of the signals is selected to be output.

On the other hand, outputs of the PS operational unit 4b and the CS operational unit 4a are used by changing over between them. In other words, for example, the signal from the network is distributed by the distributor 4d and supplied to the PS operational unit 4b and the CS operational unit 4a. The signals obtained by processing the CS operation and the PS operation are respectively provided to the switch 4c. Then, either of the signals is selected and provided to the transmitter 2.

"Operation"

A description will be made as to the procedure of the hand-over without break. It is assumed that the radio frame synchronization is performed in order also to accomplish the effective usage of frequencies and is kept within a few symbols. In the case of the hand-over without break, unless the neighboring frame phase difference falls within a few tens of degrees, an error due to the phase difference will occur at the time of changing over so that the hand-over without break cannot be realized. Accordingly, synchronization must be performed in such a manner that the frame phase difference between the master and slave base stations should fall in a range within a few degrees to a few tens of degrees.

The present embodiment features that phase adjustment is not made to all the neighboring base stations, but rather, is made in such a manner that only the phase difference of the two base stations between which the hand-over is performed, is temporarily adjusted. Accordingly, the hand-over without break can be realized relatively easily.

"Procedures of Hand-over Without Break"

Figure 1:
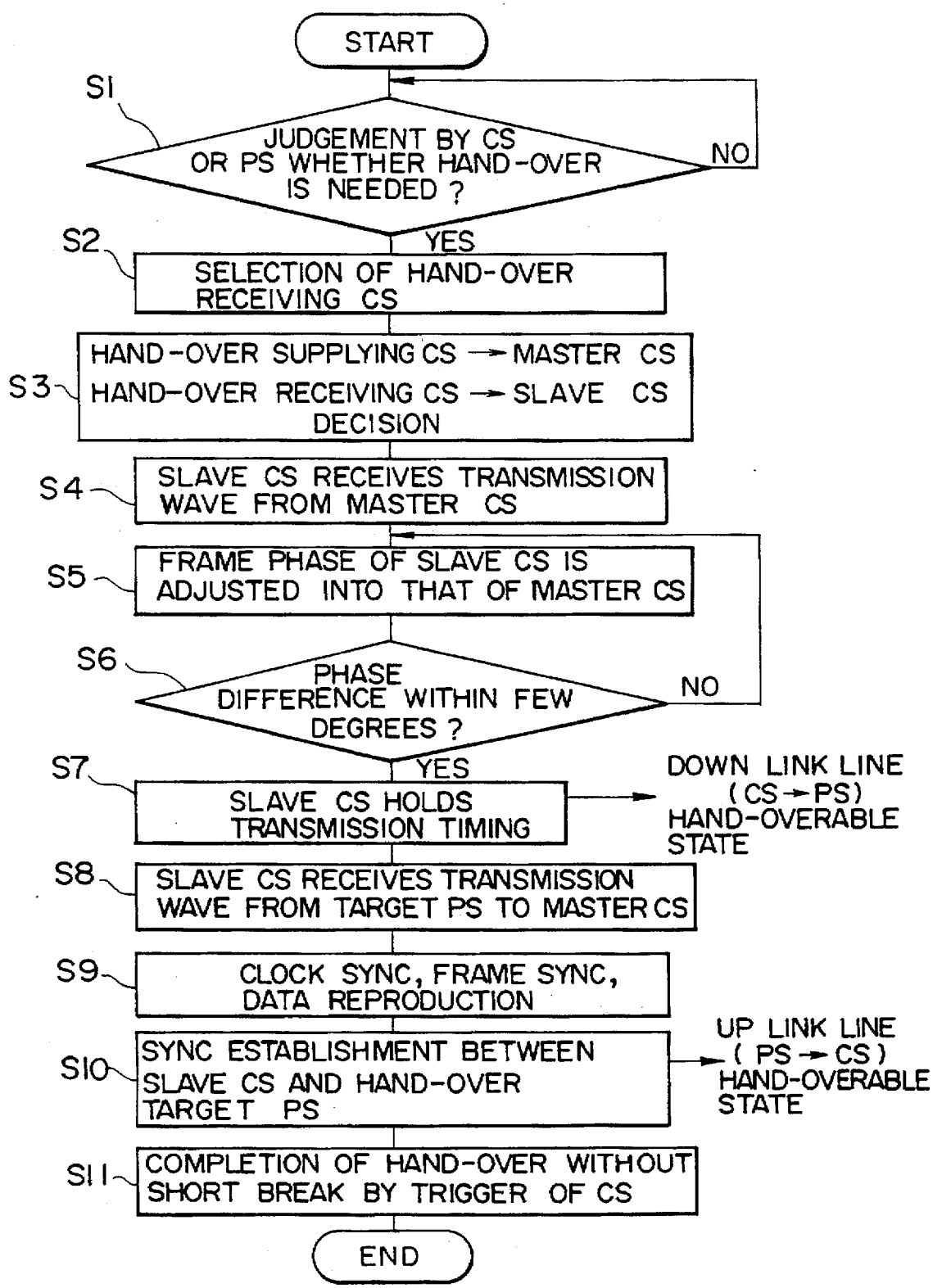
FIG. 1 is a flowchart of a hand-over method without break illustrating an embodiment of the hand-over method for mobile communication according to the present invention.

A concrete description will be made as to procedures of the hand-over without break. FIG. 1 is a flowchart illustrating a hand-over method without break. In FIG. 1, (1) the base station CS or the mobile station PS firstly deterioration of communication quality, a drop in the received electric field strength or the like, and if a judgement is made that the hand-over is necessary to be performed (S1), the base station CS selects a new base station CS as a hand-over receiving base station (S2). In this circumstance, the mobile station may help make such a selection.

(2) Then, a detailed frame synchronization is performed between the hand-over supplying base station and the hand-over receiving base station. For this frame synchronization, the hand-over supplying base station is defined as a master base station, whereas the hand-over receiving base station is defined as a slave base station (S3).

(3) Then, the slave base station receives, through the air (radio space), a radio wave transmitted from the master base station, recognizes the frame synchronous signal transferred from the master base station, and compares it with the frame timing of the slave base station (S4). In this case, the slave base station may receive either the transmission wave from the master base station to the hand-over targeted mobile station or the transmission wave at the other slot from the master base station to the hand-over non-targeted mobile station.

(4) Since there is a phase difference within a range of a few symbols between the master base station and the slave base station, the hand-over without break cannot be accomplished under such conditions. Accordingly, the slave base station operates such that it adjusts its frame phase to be the same as the frame phase of the master base station (S5). At this moment, the slave base station is considered to be operated as a mobile station which communicates with the master base station. This operation can be achieved by the combined operations of the PS operational unit 4f and the PS operational unit 4b depending on the PS operational unit 4f.

(5) Then, at the moment when the phase adjustment is completed, so that the phase difference between the master base station and the slave base station falls within a few degrees (S6), the slave base station and the master base station are mutually synchronized, which establish the down-link line from the slave base station to the mobile station hand-overable state. Then, the slave base station, at this moment, holds the transmission timing (S7) and transmits at this timing after the hand-over.

(6) Then, the slave base station receives the signal of the up-link line from the target mobile station to the master base station (S8). By doing the above, the clock synchronization and the frame synchronization are performed to reproduce data properly (S9).

(7) By the above, synchronization can be established between the slave base station and the target mobile station and the up-link line establishes a hand-overable condition (S10). Then, the hand-over without break can be completed upon being triggered by the slave base station (S11).

In the procedure (4) set forth above, the slave base station synchronizing in frame with the master base station is also communicating, at the other slots, with the other mobile station. Treatment of the other slots can be performed by any of several methods, depending on the system.

Since the guard bit is generally larger than the phase difference having a few symbols presumed above, it can be considered to be a simple method that only the target slot of the hand-over is adjusted with the slot phase propagated through the air between the master base station and the mobile station. In this case, the guard bit length of the slave base station between the target slot and the neighboring slots may, of course, be expanded or compressed as shown in FIG. 8.

Figure 8:
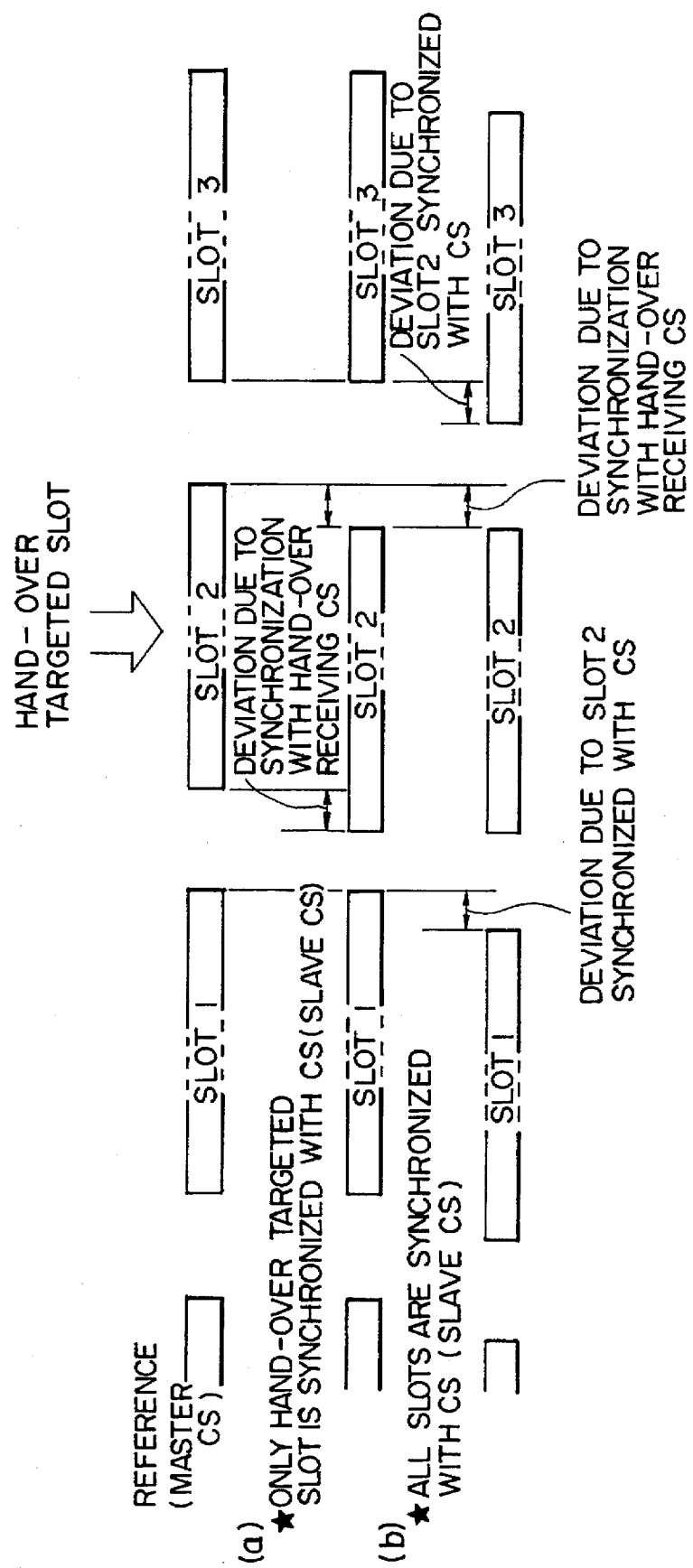
FIG. 8 is an explanatory view illustrating a method (a) in which only a slot with which a hand-over operation is performed pursuant to the relation between a radio frame synchronization accuracy and a guard bit length is synchronized with a master base cell station CS, and a method (b) in which all slots are synchronized with a master base cell station CS according to the present embodiment.

Assuming in FIG. 8 that the method (a) is defined to synchronize only the target slot with the master base station, taking into consideration the relation between the accuracy (a few symbols described above) of the radio frame synchronization and the guard bit length, all slots must be synchronized in frame with the master base station if the method (a) cannot be employed. Assuming that the above method is defined as the method (b) and the method (b) is employed, the frame synchronization must be performed with a speed with which the mobile station of the other communication party can follow to avoid interference into the communication with the mobile station performed at the slots other than the target slot.

Although the method (a) can reduce the time introductory to the frame synchronization, by accelerating the tracking speed of the base station by way of improvement of the circuit design for the base station, the method (b) should pull in the synchronization with a slow speed giving some allowance because the frame synchronization capability, of the mobile station of the other communication party cannot be known.

Figure 9:
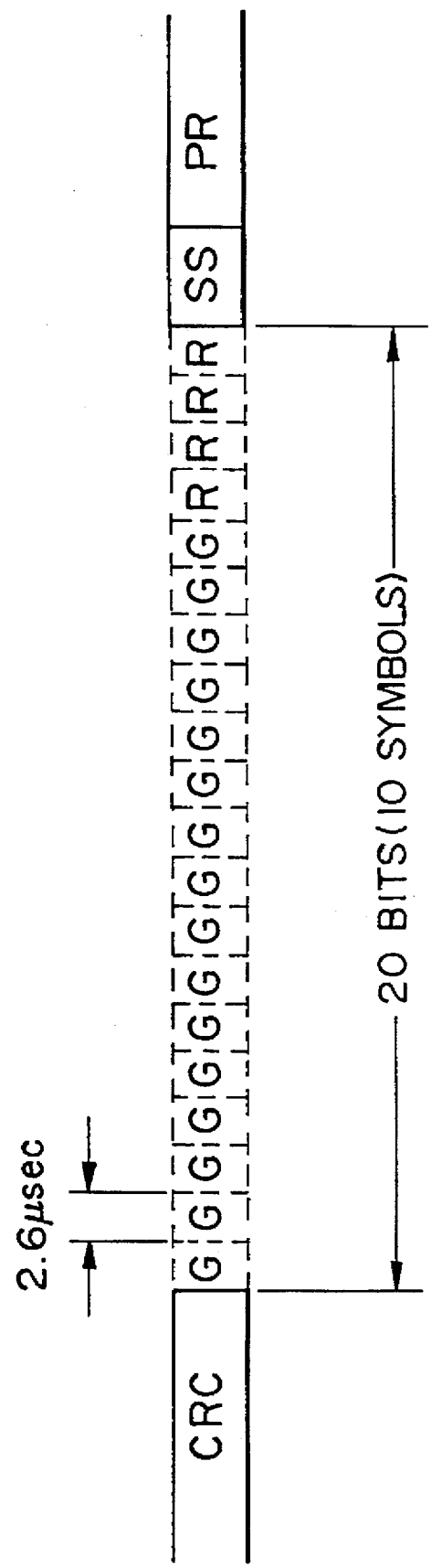
FIG. 9 is a detailed explanatory view illustrating a guard bit between each slot in the PHS according to the present embodiment.

(Guard bit):

FIG. 9 is a detailed explanatory view illustrating a guard bit between each slot of the PHS. In FIG. 9, 20 bits in total are prepared in the PHS as a guard bit G and a ramp bit R. Accordingly, if it is attempted to perform the radio frame synchronization for the effective usage for frequencies, the radio frame can be adjusted within half of 20 bits (corresponding to 5 symbols). In the drawing, reference characters CRC, SS and PR denote a CRC bit, a start symbol bit and a preamble bit, respectively.

It is also assumed that the radio frame is synchronized permanently within four symbols in order to achieve the hand-over without break.

"Concrete hand-over method without break"

Figure 10:
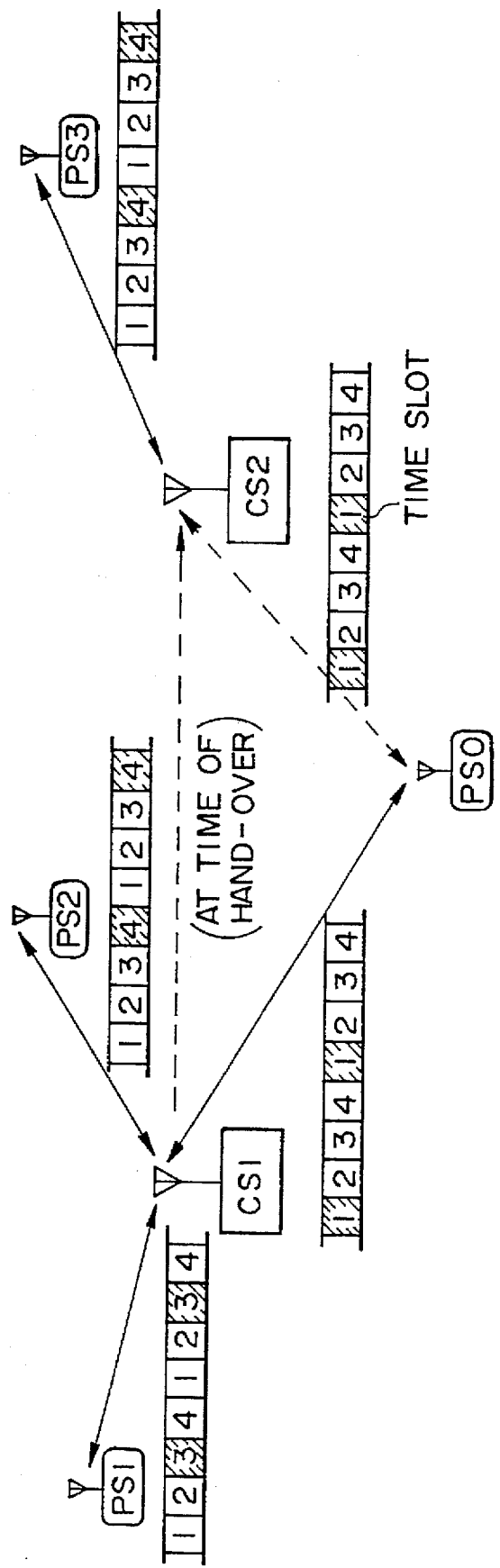
FIG. 10 is a conceptual view illustrating how a call of a mobile station PSO is handed over from a base cell station CS1 to a base cell station CS2 in accordance with the present embodiment.

FIG. 10 is a conceptual view illustrating a hand-over operation in which a mobile station PS0 is handed over from a base station CS1 to a base station CS2. In FIG. 10, a hand-over supplying base station CS1 is defined as a master base station CS and a hand-over receiving base station CS2 is defined as a slave base station.

Then, the slave base station CS2 receives a transmission wave from the master station CS1 at the slot timing (slot 1 of this example) when the hand-over is performed, and attempts to adjust the receiving clock of the slot 1 of the slave base station CS2 into the clock phase of the master base station CS1. The slave base station CS2 incorporating thereinto a circuit for detecting a difference between the receiving clock and the reproduction clock detects the frame signal if the difference falls within a few degrees. At this moment, the difference reveals a few symbols.

The following three methods can be considered as an operation which performs a hand-over by adjusting a phase difference.

The first method (A) is, as illustrated in FIG. 11(A), a method continuously adjusting the frame phase by compulsorily shifting the clock phase with a predetermined speed. The clock phase is actually shifted only within approximately 625 μsec in length in the burst having a period of 5 msec (one frame period).

Figure 12:
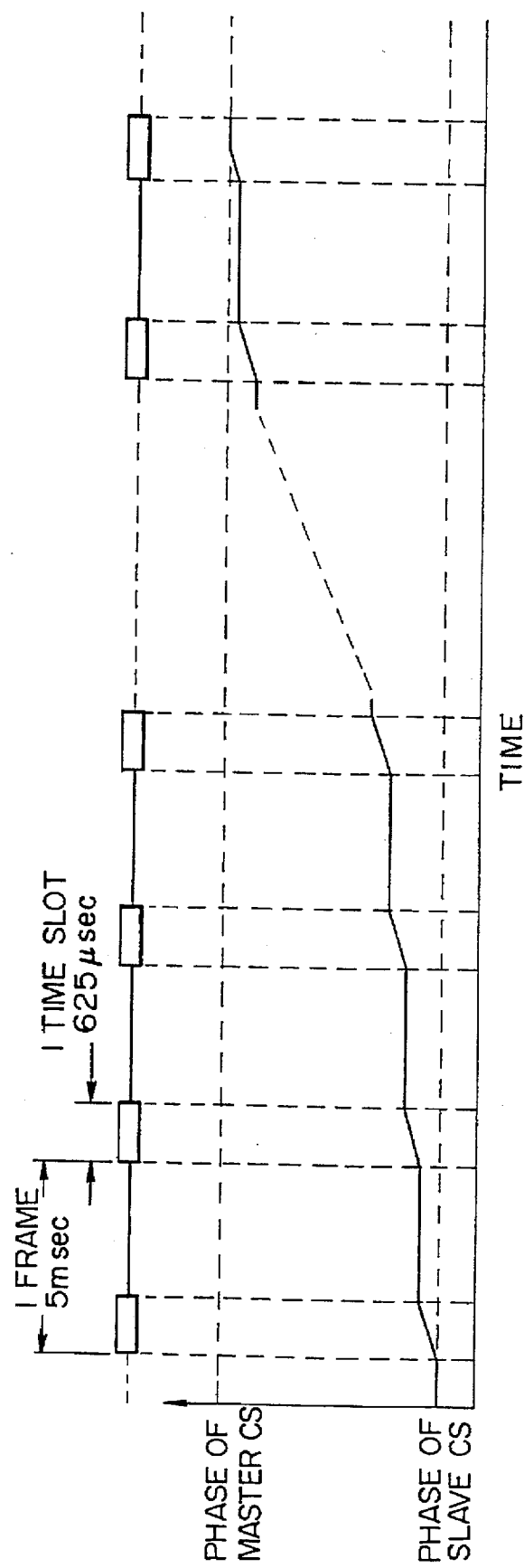
FIG. 12 is an explanatory view illustrating a transition in which the phase of a slave base station CS has been adjusted to that of the phase of a master base station CS by continuously shifting a clock phase in accordance with the present embodiment.

FIG. 12 is a chart illustrating transition steps, showing how the phase of the slave base station is adjusted to become equal the phase of the master base station, by continuously shifting the clock phase illustrated in FIG. 11.

The second method (B) is, as illustrated in FIG. 11(B), a method shifting the phase in steps one symbol at a time for each for one to a few bursts after the clock phase is adjusted. This method presupposes that either the base station or the mobile station can trace even though a deviation of one symbol would occur within the burst having a 5 msec period. The choice of one symbol in the above case is based on the assumption that it would be difficult to firmly receive every burst in a condition of bad propagation of waves between the base stations.

The third method (C) is similar, as illustrated in FIG. 11(C), to the second method (B) to the extent that the phase is shifted one symbol at a time after the clock phase is adjusted. This method, however, provides prompt activation of the hand-over instead of adjusting the symbol difference to zero when either the base station or the mobile station falls within the traceable symbol difference. This method has an advantage that the hand-over operation can be promptly performed whenever the clock synchronization is accomplished.

Although the above description is made on the assumption that the hand-over is carried out between slots bearing the same number, there can actually be a case that the slot bearing the same slot number is occupied. Accordingly, a description will be made hereinbelow as to the case that the hand-over is carried out to a slot bearing a different slot number due to the occupancy of the slot bearing the same slot number.

Firstly, in the case of the hand-over with the same slot number, the hand-over receiving base station has a vacant slot bearing the same number assigned to the slot with which the hand-over supplying base station communicates with the target mobile station for hand-over so that the hand-over receiving base station can perform the phase synchronization to the down-link line by receiving the transmission wave transmitted from the hand-over supplying base station to the target mobile station. The hand-over receiving base station can also perform the phase synchronization to the up-link line by receiving the transmission wave transmitted from the target mobile station during the communication between the hand-over supplying base station and the target mobile station.

On the contrary, in the case of the hand-over with a different slot number, the phase synchronization to the down-link line can be established by receiving a transmission wave (a transmission wave to the other mobile station or a temporary dummy transmission wave for hand-over) from the hand-over supplying base station with a new slot by the hand-over receiving base station. However, the phase synchronization to the up-link line is impossible because a transmission wave from the hand-over supplying mobile station cannot be received by the hand-over receiving base station.

Accordingly, in the above case there is a high possibility that only the signal of the up-link line would suffer from the break. However, since the frame phase of the up-link line can be predicted in accordance with the frame phase of the down-link line, a high speed pull-in circuit can normalize the receiving state within one to two slots. To accomplish the hand-over without break towards the different number slot in both the up and down link lines, the hand-over supplying base station changes in advance the slot currently used to the other slot bearing the same number assigned to the slot of the hand-over receiving base station, or the hand-over receiving base station changes in advance the slot currently used for communication with the other mobile station to the other slot bearing a different slot number, so that the slots bearing the same slot number can be used when the hand-over is actually performed.

In the above case, transfer of the slot in the same base station without causing any break can be easily accomplished by using quasi-mobile station function.

"Hand-over speed without break":

Now, an estimation is made as to a speed (time) required for a concrete hand-over without break. Although the clock synchronous speed of the PHS varies depending on the system, 0.4°/symbol is employed as the estimated value. Assuming that a target symbol number for clock reproduction per one burst is 106, a clock compensation speed per one burst will be 42.4° (=0.4°×106).

(a) If calculated with the above value, the method (A) described above reveals at maximum 34 bursts (=360°×4/ 42.4°) which are converted into time as 170 msec (=34 bursts×1/200 Hz). This time is assigned to the signal of the down-link line as the phase synchronous time. Assuming that the phase synchronization of the up link line from the mobile station to the base station will be established, after the lapse of the above time, with four slots (180°/42.4°), an additional time of 22.5 msec (=2.5 msec+5 msec) is added so that a total time becomes 192.5 msec.

(b) The method (B) described above, assuming that after adjusting the phase more adjacent to the half symbol, one symbol compensation is made once per four bursts, requires 100 msec (=180°/42.4°/200 Hz+5 msec×(4×4)). In taking the phase synchronization of the up link line into account in the same manner, the total required time will be 122.5 msec.

(c) The method (C), assuming that the hand-over is promptly performed after adjusting the phase more adjacent to the half symbol in the same manner as that of the method (B), requires 26 msec (=180°/42.4°/200 Hz+5 msec). In taking also the phase synchronization of the up-link line into account, the total required time will be 48.5 msec.

The above calculation is made on the assumption that only the slot which is targeted to be handed over is synchronized with the master base station.

(d) Next, a change-over speed is calculated for the case that the entire slave base station must be synchronized with the master base station. The required time in this case depends not only on the clock reproduction capability of the target base station, but also on the tracing capability of the communicating mobile station. Assuming that the speed with which all the mobile stations can stably trace is set to be 1/10 of the above speed, the tracing speed becomes 4°/burst. Each speed for the above three methods (A), (B), (C) will be calculated on the basis of the above figure as follows:

In the case of the method (A) . . . 1.8 msec
In the case of the method (B) . . . 320 msec
In the case of the method (C) . . . 250 msec If only the change-over speed is considered, the method letting only the target slot be traced is superior.

The above mentioned hand-over without break may generate a propagation delay time difference due to the distance difference between the various base stations and the mobile stations. Assuming, for example, that in the PHS the distance between both base stations is approximately 150 m and the hand-over operation is performed in the vicinity of the hand-over receiving base station, the distance difference between the base station and the mobile station will be approximately 150 m and the propagation delay time difference will be approximately 0.5 μs. Since the symbol length of the PHS is approximately 5.2 μsec, the phase error will be approximately 34°, which may not cause any significant damage in performance.

"Utilization style":

Although described above as to the phase error caused by the distance difference between the base station and the mobile station, the following methods are also applicable to eliminate the propagation delay difference.

(I) In the case of the hand-over, the hand-over receiving base station, for example, sets the tracing speed of the clock reproduction circuit high during the entire burst time, or the preceding time so as to achieve a prompt optimum operation (to perform the high speed phase synchronization within a range of the frame signal).

(II) Protection of synchronization provided to the frame signal detection guarantees a normal receiving operation unless the signals successive to the frame signal reveal an error even though the frame signal (the UW signal in the PHS frame format) cannot be detected in accordance with the initial phase difference. This procedure can realize the normal hand-over notwithstanding a phase difference of more than 50°.

Since the above mentioned procedure can be accomplished by the base station only without relying on the mobile station, it can be realized notwithstanding the mobile station. According to the hand-over method without break in accordance with the above mentioned embodiment, the hand-over without break can be relatively easily realized without the help of the mobile station by adding a small amount of control functions for the base station to the control unit 4. Accordingly, the hand-over without break can be realized in the PHS with the most speedy method having approximately 50 msec.

Further, the present invention can provide communication service to the subscriber mobile station moving with a limited high speed in a microcell having a range for communications of approximately 100 m. Accordingly, if the present invention is applied to the PHS in which frequent movement of the mobile station may occur between the radio zones, a high quality mobile communication system eliminating the break can be realized.

Although the description was made as to the PHS utilizing microcells to which the present invention is effectively applied, the present invention is not limited to be particularly applied to the PHS, and is rather applicable to the other mobile communication system utilizing microcells or a mobile communication system utilizing macrocells.

What is claimed is:

1. A hand-over method utilized when a mobile station moves from a radio zone of a first base station to a radio zone of a second base station, the method comprising:

receiving a first down-link signal, from the first base station to the mobile station, by the second base station;

adjusting a clock phase for a second down-link signal from the second base station to the mobile station into a clock phase of the first down-link signal;

receiving a first up-link signal, from the mobile station to the first base station, by the second base station;

adjusting a clock phase for a second up-link signal from the mobile station to the second base station into a clock phase of the first up-link signal; and performing by the second base station a hand-over operation.

2. A hand-over method as set forth in claim 1, wherein a high accuracy frame synchronization is performed during a predetermined period of time until completion of the hand-over between the first base station and the second base station.

3. A hand-over method as set forth in claim 1, wherein a frame phase of the second base station is adjusted into a frame phase of the first base station by continuously shifting a clock phase with a predetermined speed.

4. A hand-over method as set forth in claim 3, wherein the clock phase is shifted within approximately 625 μsec of a burst having a period of 5 msec (one frame period).

5. A hand-over method as set forth in claim 3, wherein a slot of the first base station and a slot of the second base station bear a same slot number.

6. A hand-over method as set forth in claim 1, wherein a frame phase of the second base station is adjusted into a frame phase of the first base station by shifting a phase symbol-by-symbol unit after a clock phase was adjusted.

7. A hand-over method as set forth in claim 6, wherein the frame phase is shifted in steps once per one to a few bursts, the burst having a period of 5 msec.

8. A hand-over method as set forth in claim 6, wherein a slot of the first base station and a slot of the second base station bear a same slot number.

9. A hand-over method as set forth in claim 1, wherein a frame phase of the second base station is adjusted into a frame phase of the first base station by shifting a phase per symbol unit after the clock phase is adjusted, and the hand-over operation is performed when either the second base station or the mobile station falls into a symbol difference enabled to be tracked.

10. A hand-over method as set forth in claim 9, wherein a slot of the first base station and a slot of the second base station bear a same slot number.

11. A hand-over method as set forth in claim 1, wherein the second base station synchronizes in frame only a hand-over target slot with the first base station.

12. A hand-over method as set forth in claim 1, wherein the second base station synchronizes in frame all slots including a hand-over target slot with the first base station.

13. A hand-over method as set forth in claim 1, wherein if a slot number of the first base station differs from that of the second base station, the first base station shifts in advance its slot number to that of the second base station.

14. A hand-over method as set forth in claim 1, wherein if a slot number of the first base station differs from that of the second base station, the second base station transfers the communication of another mobile station from the slot number utilized prior to the hand-over operation being performed to another slot number.

15. A hand-over method as set forth in claim 1, wherein the second base station sets the tracing speed of its clock reproduction circuit high, at the hand-over operation, so as to perform a protection for frame synchronization.

16. A hand-over method as set forth in claim 1, wherein the method is applied to a mobile communication system having a narrow cell range.

17. A hand-over method as set forth in claim 16, wherein the mobile communication system is a PHS system.

18. A hand-over method as set forth in claim 17, wherein the cell range is a range of a microcell.

19. A hand-over method as set forth in claim 16, wherein the cell range is a range of a microcell.

* * * * *